United States Patent
Chiari et al.

(10) Patent No.: US 10,569,975 B2
(45) Date of Patent: Feb. 25, 2020

(54) METHOD FOR SUPPLYING PLATE ELEMENTS TO A MACHINE, SUPPLY STATION AND PROCESSING MACHINE THUS EQUIPPED

(71) Applicant: BOBST MEX SA, Mex (CH)

(72) Inventors: Mauro Chiari, Denges (CH); Daniel Cazes, Rueyres (CH)

(73) Assignee: BOBST MEX SA (CH)

( * ) Notice: Subject to any disclaimer, the term of this patent is extended or adjusted under 35 U.S.C. 154(b) by 0 days.

(21) Appl. No.: 15/322,380

(22) PCT Filed: Jun. 24, 2015

(86) PCT No.: PCT/EP2015/025038
§ 371 (c)(1),
(2) Date: Dec. 27, 2016

(87) PCT Pub. No.: WO2015/197199
PCT Pub. Date: Dec. 30, 2015

(65) Prior Publication Data
US 2017/0129719 A1 May 11, 2017

(30) Foreign Application Priority Data
Jun. 27, 2014 (EP) .................................. 14002202

(51) Int. Cl.
*B65G 59/02* (2006.01)
*B65H 1/26* (2006.01)
(Continued)

(52) U.S. Cl.
CPC ........... *B65G 59/026* (2013.01); *B65G 59/02* (2013.01); *B65H 1/263* (2013.01); *B65H 3/242* (2013.01);
(Continued)

(58) Field of Classification Search
CPC ...... B65H 2301/422; B65H 2301/4228; B65H 3/322; B65H 3/242; B65H 2511/152; B65H 3/24; B65G 59/026; B65G 59/02
(Continued)

(56) References Cited

U.S. PATENT DOCUMENTS 2,963,177 A * 12/1960 Shields .................... B65H 3/24
198/418
3,744,649 A * 7/1973 Ward, Jr. ............. B65G 57/308
271/212
(Continued)

FOREIGN PATENT DOCUMENTS

WO    WO 2010/105762 A1    9/2010

OTHER PUBLICATIONS

International Search Report dated Oct. 13, 2015 issued in corresponding International patent application No. PCT/EP2015/025038.

*Primary Examiner* — Lynn E Schwenning
(74) *Attorney, Agent, or Firm* — Ostrolenk Faber LLP

(57) ABSTRACT

A method for supplying plate elements to a machine for processing the plate elements, from an initial pile of elements, the method includes: pushing a first batch of plate elements, from the top of the pile, downstream until the first batch comes at a storage capable of storing the first pushed batch, and simultaneously, displacing the storage downstream over a distance corresponding to the length of the first batch to separate the first batch from the pile; and thereafter transferring the elements of the first batch one after the other to the machine.

12 Claims, 3 Drawing Sheets

(51) Int. Cl.
*B65H 83/02* (2006.01)
*B65H 3/24* (2006.01)

(52) U.S. Cl.
CPC ..... *B65H 83/02* (2013.01); *B65H 2301/4213* (2013.01); *B65H 2701/176* (2013.01)

(58) Field of Classification Search
USPC .......................................................... 414/796
See application file for complete search history.

(56) References Cited

U.S. PATENT DOCUMENTS

| | | | | |
|---|---|---|---|---|
| 4,195,959 | A * | 4/1980 | Schmitt | B65G 57/035 414/788.9 |
| 4,457,658 | A * | 7/1984 | Meylan | B65H 3/242 414/795.8 |
| 4,988,265 | A * | 1/1991 | Schwab | B65G 59/02 271/130 |
| 5,326,088 | A * | 7/1994 | Newsome | B65H 3/126 270/52.18 |
| 5,352,085 | A * | 10/1994 | Sargent | B65H 3/322 271/6 |
| 5,924,839 | A * | 7/1999 | Dopke | B65G 59/02 414/796 |
| 6,062,764 | A * | 5/2000 | Rixen | F16B 37/046 403/22 |
| 6,146,084 | A * | 11/2000 | Doyle | B65G 57/035 414/788.9 |
| 6,481,954 | B1 * | 11/2002 | Benuzzi | B27B 31/00 144/245.7 |
| 6,595,740 | B1 * | 7/2003 | Drake | B65H 1/00 271/157 |
| 8,113,503 | B2 | 2/2012 | Roth et al. | |
| 8,608,151 | B2 * | 12/2013 | Chiari | B65H 3/0825 271/214 |
| 8,657,555 | B2 * | 2/2014 | Kokubo | B65H 31/20 271/215 |
| 9,150,382 | B2 * | 10/2015 | Allen | B65H 29/50 |
| 9,862,552 | B2 * | 1/2018 | Beer | B65G 47/766 |
| 2009/0115122 | A1 | 5/2009 | Roth et al. | |
| 2011/0268550 | A1 | 11/2011 | Kokubo et al. | |

* cited by examiner

METHOD FOR SUPPLYING PLATE ELEMENTS TO A MACHINE, SUPPLY STATION AND PROCESSING MACHINE THUS EQUIPPED

CROSS-REFERENCE TO RELATED APPLICATIONS

The present application is a 35 U.S.C. §§ 371 national phase conversion of PCT/EP2015/025038, filed Jun. 24, 2015, which claims priority of European Patent Application No. 14002202.1, filed Jun. 27, 2014, the contents of which are incorporated by reference herein. The PCT International Application was published in the French language.

TECHNICAL FIELD

The present invention relates to a method for supplying plate elements to a machine for processing plate elements. The invention also relates to a station for supplying plate elements to a machine for processing plate elements. The invention further relates to a machine for processing plate elements provided with such a station for supplying such plate elements.

TECHNICAL BACKGROUND

A processing machine, for example a machine for cutting or printing, is used in the packaging industry, for example to cut or print plate elements such as cardboard sheets. Said printed sheets then serve to produce cardboard boxes.

The processing machine generally comprises a plurality of stations or workstations, each designed to carry out a specific operation. The plate elements are introduced into the inlet of the machine via a feed station or feeder installed upstream. The plate elements are collected at the outlet of the machine in the delivery station in the downstream direction in the form of processed elements, blanks or boxes ready for use.

PRIOR ART

The feeder automatically inserts the elements one after the other into the machine. A batch of stacked elements is placed into the feeder. The feeder initially comprises a lower vacuum conveyor. The feeder also comprises a vertical gauge. The gauge serves for the frontal alignment of the elements. This gauge is also used for removing the elements one after the other from the bottom of the batch. The vacuum conveyor conveys the elements into the machine separately and successively one after the other. The elements are then driven and processed one after the other in the machine.

A first drawback is that the batch exerts a significant pressure force, primarily on the element at the bottom of the batch placed on the conveyor. This pressure is all the greater if the box has a high grammage and the height of the batch is significant. This pressure tends to crush these successive bottom elements and exert a stress, disturbing the conveyance of the element via the feeder, reducing the quality of the feeding operation and as a result the conveyance of the elements into the machine. In certain cases, the register of the fed elements is lost. In other cases, the feeder inserts two elements at once instead of one at a time, which is not desirable.

Such a pressure also increases the friction between the element at the bottom of the pile and the element immediately above, with which it is in contact, when the element at the bottom is conveyed. Since the surfaces are able to be pre-printed or coated with a layer, for example a white color or other colors, they will be damaged by marks.

To supply the machine, an operator continually places small batches of stacked elements into the feeder. The operator picks up and carries these batches by hand. This makes the work of the operator particularly tiresome, for example when processing sheets of corrugated cardboard of large dimensions. Moreover, such manual loading limits the capacity in terms of processing speeds.

Moreover, at rapid production rates, the batch of elements will reduce very rapidly and will require immediate restocking. The interval between the transition from a first pile to the subsequent pile results in a discontinuous supply of elements. Non-stop operation is not possible.

To ensure a rapid production rate of the processing machine, a loading station is most often integrated in the machine, upstream of the feed station. The loading station comprises a loader for a pile of plate elements. The documents U.S. Pat. No. 8,113,503 and WO 2010/105,762 disclose a station for loading plate elements, from an initial pile of elements arranged in a magazine in the direction of a feed station for a machine for processing elements. The station comprises unloading means, unloading the elements from the initial pile, and intermediate storage means, storing the unloaded elements in the form of an intermediate batch. Conveying means convey the elements in the form of a stream from the storage means to the feed station.

However, such a station constitutes additional equipment which is added to the processing machine. The total size requirement of the machine combined with its station becomes considerable. Even with a station it still remains necessary to form a new batch in the feeder, in addition to the intermediate batch. The addition of a loading station is only justified for high operating volumes and production rates of the processing machine.

SUMMARY OF THE INVENTION

A principal object of the present invention is to provide a method for supplying a machine for processing plate elements. A second object is to produce a supply station designed for a machine for processing plate elements. A third object is to remedy the aforementioned technical problems for the feed station and the loading station of the prior art. A further object is that of managing to incorporate a supply station upstream of a machine for producing packaging.

According to one embodiment of the present invention, a method for supplying plate elements to a machine for processing plate elements, from an initial pile of plate elements, comprises several steps:

pushing a first batch of plate elements downstream, from the top of the initial pile of plate elements, and until the first batch of plate elements comes to a storage device which are capable of storing the first pushed batch of plate elements;

and displacing the storage device downstream over the distance corresponding to the length of the first batch of plate elements, wherein this step simultaneously comprises pushing the first batch of plate elements downstream over a distance corresponding to the length of the first batch of plate elements, to separate the first batch of plate elements from the initial pile of plate elements;

transferring the plate elements of the first batch of plate elements one after the other to the machine for processing the plate elements.

Throughout the description, the plate element is defined, by way of a non-limiting example, as being made of a material such as paper, flat cardboard, corrugated cardboard, laminated corrugated cardboard, flexible plastics, for example polyethylene (PE), polyethylene terephthalate (PET), biaxially oriented polypropylene (BOPP) or other polymers, or other materials.

The processing machine is defined, by way of non-limiting example, as being a cutting machine, for example a platen die-cutting machine, a creasing machine, an embossing machine, a forming machine, a stamping machine, for example a hot stamping machine, known by the term "hot foil stamping", a machine for fixing labels or holograms, a folding-gluing machine, a printing machine, with at least one printing unit, for example flexographic, heliographic, offset, digital inkjet printing, or the like.

The longitudinal direction is defined with reference to the direction of displacement of the element in the machine along its median longitudinal axis. The upstream and downstream directions are defined with reference to the direction of displacement of the plate element, in the longitudinal direction in the supply station and in the entire processing machine.

In other words, once the first batch is pushed and stabilized, the plate elements are directly conveyed one by one into the machine, which then immediately carries out the processing of the plate elements one after the other. With such a method, the batch of plate elements is pushed toward the storage means and is accompanied by the storage means. The batch of plate elements is held at the storage means. The transfer of the plate elements one after the other is ensured continuously, the initial piles being regularly restocked, to ensure the continuity of supply of the machine and thus of the production.

In a further embodiment of the invention, a station for supplying plate elements to a machine for processing plate elements, from an initial pile of plate elements arranged in a magazine, comprises:
- a pusher, capable of pushing in the downstream direction a batch of plate elements, from the top of the initial pile of plate elements,
- a storage device, capable of receiving and storing the pushed batch of plate elements, the storage means being positioned downstream of the pusher, and
- a transfer device capable of transferring the plate elements one after the other, from the storage device to the machine for processing the plate elements.

The station comprises a displacement device, capable of displacing simultaneously from upstream to downstream the storage device and the transfer device over a distance corresponding to the length of the pushed batch of plate elements, so as to permit the pusher and the storage device to separate the batch of plate elements from the initial pile of plate elements and to conserve the batch of plate elements at the storage device and the transfer device.

The batch of plate elements is thus correctly stored, since it is aligned at the front by the storage means and at the rear by the pusher. The storage device is displaced according to the format of the batch of plate elements and thus the plate elements which constitute the batch. The formation of a stream of plate elements is avoided, which makes the supply station more compact.

According to a further embodiment of the invention, a processing machine for plate elements is provided with a supply station as disclosed below.

BRIEF DESCRIPTION OF THE DRAWINGS

The invention will be understood clearly and its various advantages and different features will emerge more clearly from the following description of the non-limiting exemplary embodiment, with reference to the accompanying schematic drawings, in which.

DETAILED DESCRIPTION OF A PREFERRED EMBODIMENT

Figure 1:
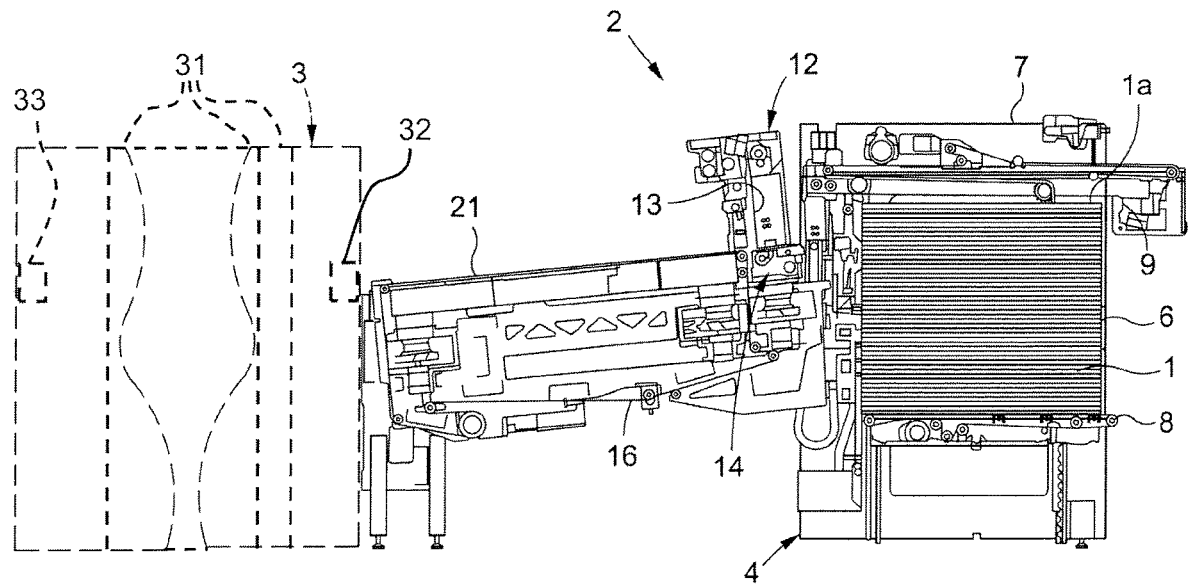
FIG. 1 shows a side view of a processing machine for plate elements provided with a supply station according to the invention.

FIG. 1 illustrates a machine for processing plate elements, for example cardboard sheets 1, in the form of a digital inkjet printing machine 2. The printing machine 2 comprises a frame 3 (shown in dashed lines) and different printing units 31, such as inkjet printing heads placed in rows one after the other. The sheets 1 are processed by being printed. The sheets 1 are picked up, introduced into the inlet 32 of the machine 2, transported, circulate by passing at each of the heads through the printing machine 2, collected at the outlet 33 of the machine 2, and emerge at a delivery station.

The machine for printing the sheets is advantageously provided with a supply station 4. This station 4 is mounted upstream of the printing machine 2 so as to supply the machine with sheets 1 at a high output. The median longitudinal axis of the station 4 is aligned with the median longitudinal axis of the machine 2. In the machine 2, a unit (not shown) for the lateral alignment of the sheets 1 may be arranged downstream of the supply station 4.

Figure 5:
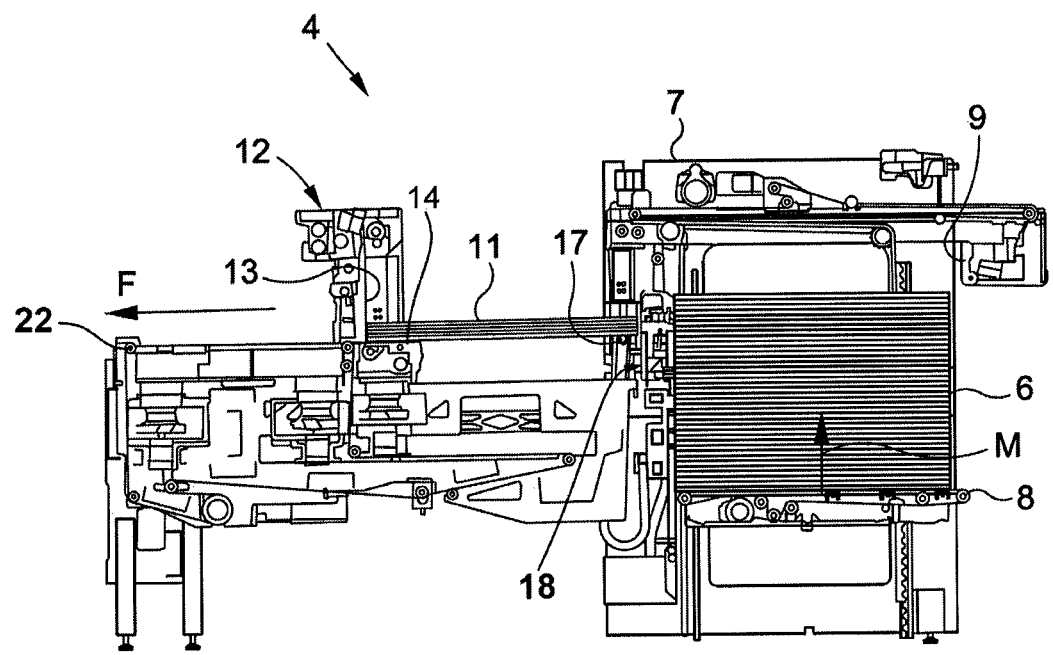
Figure 6:
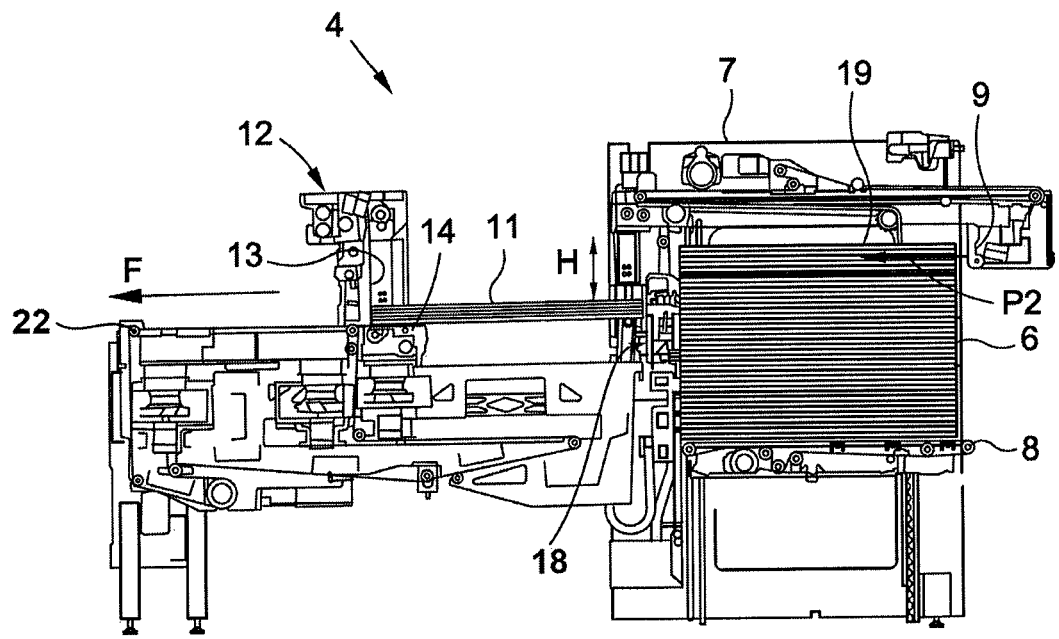

The sheets 1 firstly arrive in the station 4 in an initial main vertical pile 6 placed in a principal storage magazine 7 located upstream. The sheets 1 leave this magazine 7 and emerge from the station 4 in the downstream direction in order to enter the machine 2. The direction of advance or travel (arrow F in FIGS. 4 to 6) also called the conveyance path or cardboard advance direction, for the sheets 1 in the longitudinal direction, indicates the upstream direction and the downstream direction.

The magazine 7 and thus the station 4 may comprise a pile loader (not visible) for the pile 6 of sheets 1. The loader is of the pile lifter type with a pile lifting mechanism, which comprises a substantially horizontal lifting platform 8, supporting the pile 6 of sheets 1. The lifting platform 8 is driven vertically by the lifting mechanism. The lifting mechanism comprises an electric motor, vertically lifting or lowering the platform 8. The motor also permits the precise position of the platform 8 to be ascertained and guaranteed.

The platform 8 gradually rises as the sheets 1 depart in the downstream direction. To reload a new pile 6 of sheets 1 on the platform 8 to supply the station 4, the platform 8 is lowered by the lifting mechanism.

The station 4 comprises a pusher 9. The pusher 9 is displaced from upstream to downstream, pushing (arrow P in FIGS. 2 and 3) a batch of sheets 11 taken from the top of the pile 6. The pusher 9 then returns empty in the reverse direction from downstream to upstream once the pushed batch 11 is stabilized.

The magazine 7 with its pile loader and thus the station 4, may comprise a pile-top sensor 6 (not shown). The pile-top sensor may be connected to an input of a calculator. The calculator may act on the lifting mechanism to maintain the successive upper sheets 1a at a constant level after each departure of a batch 11. The calculator is programmed so that the signal appearing at its output is characteristic of the difference between the measured level of the top of the pile 6 and a reference variable calculated on the basis of the thickness of the batch 11.

The station 4 comprises storage device 12 which is capable of storing the pushed batch 11. The storage device 12 is positioned downstream of the pusher 9. The storage device 12 may be in the form of a front positioning member of the batches 11. The positioning member serves to maintain a fixing of the first batch 11, as well as the following batches arriving subsequently by being pushed by the pusher 9. The positioning member is, for example, of the front and vertical gauge type 13. The gauge 13 serves for the frontal alignment of the batch 11 and thus of the sheets 1. This gauge 13 also serves for the successive removal of the sheets 1 from the bottom of the batch 11 (see FIG. 4). A slot is left below the gauge 13, and the sheets 1 travel one after the other via this slot. This slot is of variable height, selected as a function of the thickness of the sheets 1.

The station 4 comprises a transfer device 14, capable of transferring the sheets 1 one after the other from the storage device 12 to the remainder of the machine 2. To achieve this, the transfer device 14 may comprise an endless belt vacuum conveyor. The sheets 1 of the batch 11 are taken one by one from the bottom of the batch 11. The vacuum conveyor picks up each sheet by its lower front part and conveys it downstream. Advantageously, the storage device 12 is joined to the transfer device 14.

Figure 2:
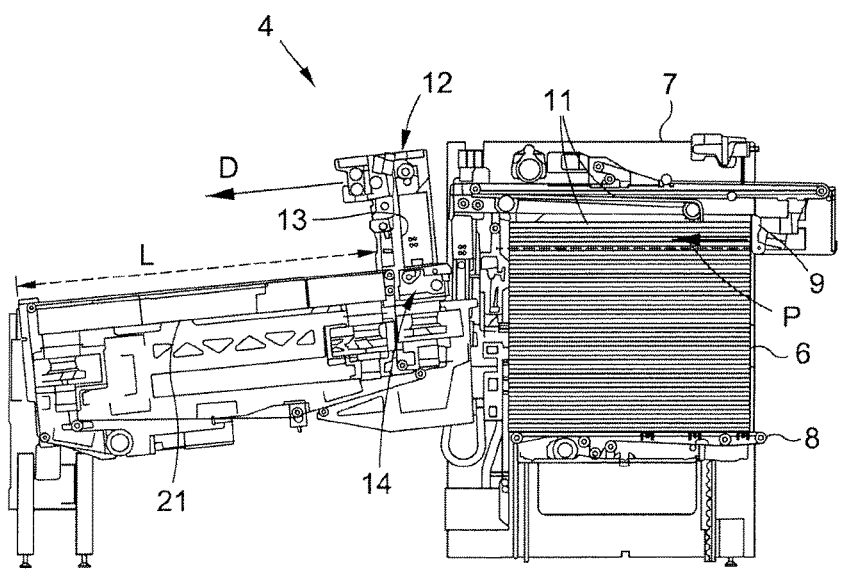
FIGS. 2 to 6 show side views of the station in different operating positions.
Figure 3:
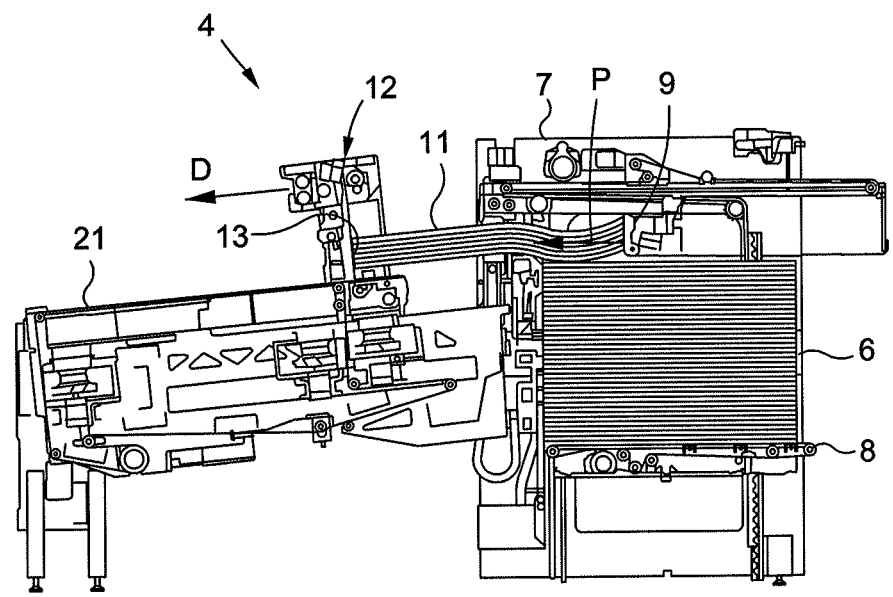

According to the invention, the station 4 comprises displacement device 16 capable of displacing simultaneously from upstream to downstream the storage device 12 and the transfer device 14 (arrow D in FIGS. 2 and 3). The displacement is carried out over a distance which corresponds to the length of the pushed batch 11. This displacement is carried out at the same time as the movement of the pusher 9 in the downstream direction. This displacement permits a first batch 11 to be separated from the pile 6 and to keep the first batch 11 at the storage means 12 and the transfer means 14.

The station 4 advantageously comprises a support device 17 for supporting the first batch 11. The support device 17 is positioned between the pusher 9 and the storage device 12. The support device 17 is capable of being extended as a function of the length of the first pushed batch 11. The support device 17 is, for example, in the form of one or more rollers, the lower sheet 1 of the first batch 11 bearing against said rollers.

Preferably, the station 4 comprises a device 18 to vary simultaneously the height (H in FIG. 6) of the storage device 12, the transfer device 14 and, as a result, the first batch 11 which has just been pushed. This height H is adjustable as a function of the thickness of the second subsequent batch 19 which will then be pushed by the pusher 9 after the first batch 11. This permits the second batch 19 to be pushed, and to slide directly on the first batch 11 which is already in place at the storage device 12. Since this height H is adapted, the sheets 1 of the second batch 19 will not be damaged by falling onto the sheets 1 of the first batch 11.

Advantageously, the station 4 comprises a conveyor of variable length 21. The conveyor 21 is positioned downstream of the storage device 12 and transfer device 14, i.e. downstream of the gauge 13. The conveyor 21 collects directly one by one the sheets 1 transferred by the conveyor of the transfer device 14 and transports them downstream F toward the machine 2. The conveyor 21 is joined to the storage device 12 and to the transfer device 14. The storage device 12, the transfer device 14 and the conveyor 21 have a configuration which is inclined downwardly in the downstream direction. This inclination permits the pushing and the arrival of the first batch 11 at the storage device 12 to be facilitated.

Figure 4:
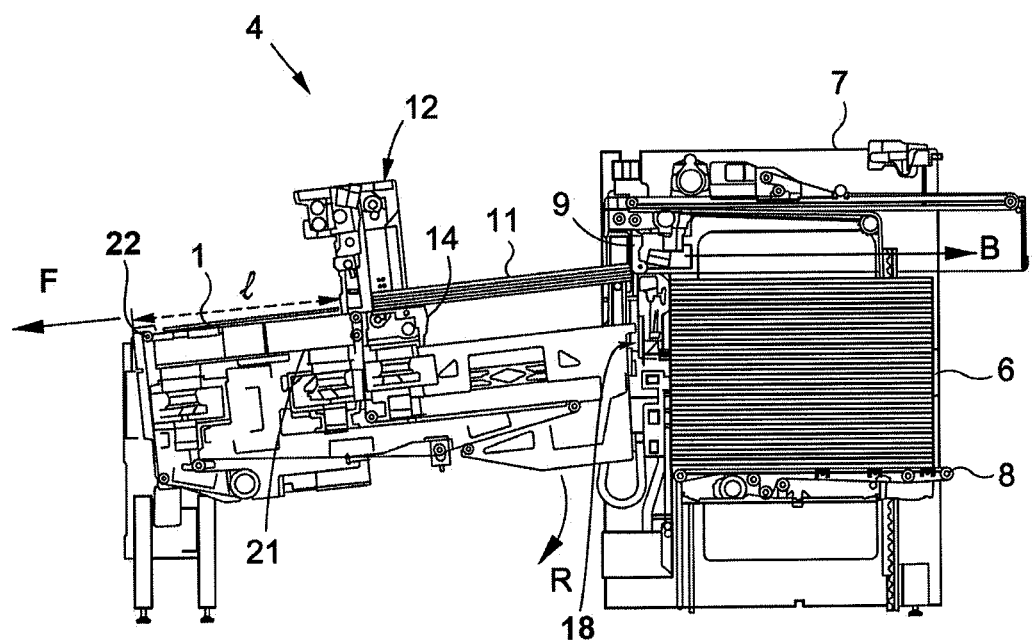

The conveyor 21 has a length (1 and L in FIGS. 2 and 4) which is a function of the length of the first batch 11 and which is a function of the maximum travel provided for the displacement of the storage device 12 and the transfer device 14. Before pushing the first batch 11, the conveyor 21 has a length of maximum dimensions L (FIG. 2). After pushing the first batch 11, the conveyor 21 has a length of minimum dimensions 1 (FIG. 4). The conveyor 21 may be formed by empty sliding containers of variable length and an endless belt.

Advantageously, the device 18 for varying the height of the storage device 12 is capable of pivoting (arrow R in FIG. 4) the transfer device 14, the storage device 12 and the conveyor 21. The pivoting R is carried out relative to an axis 22 located at the downstream end of the conveyor 21. The first batch 11 thus passes from its position which is slightly inclined upwardly and to the rear in order to be placed substantially horizontally. This new position of the first batch 11 facilitates the sliding of the second batch 19 on this first batch 11.

A method for supplying sheets 1 to the machine for processing sheets 2 from the initial pile 6 of sheets 1 comprises several successive steps implemented by the supply station 4.

A first step comprises actuating the pusher 9 (FIG. 2) and pushing P (FIG. 3) in the downstream direction the first batch of sheets 11 removed from the top of the pile 6 placed in the magazine 7. The pusher 9 pushes until the first batch 11 comes into abutment against the front positioning member, i.e. the gauge 13.

A second step comprises displacing D the storage device 12, i.e. the gauge 13, downstream over a specific distance corresponding to the length of the first batch 11. This second step is implemented simultaneously with the first step. In these first and second steps, the pusher 9 is displaced by pushing the first batch 11 over a specific distance which corresponds to the length of the first batch 11. As a result, the transfer device 14 are displaced D in a similar manner. The first batch 11 is separated from the pile 6.

A third step comprises actuating the transfer device 14 so as to transfer F successively the sheets 1 of the first batch 11 which is now located in the pushed position. The sheets 1 are thus transferred from the storage device 12 on the conveyor 21.

Once the first batch 11 is pushed and stabilized with the sheets which are already being transferred, the pusher 9 returns upstream into its initial position (arrow B in FIG. 4).

The method for supplying sheets 1 to the machine for processing sheets 2 also advantageously comprises two further additional steps. These two steps take place after the step consisting of transferring the sheets 1. The first of these two steps consists in lowering the height of the storage device 12 according to a height H. This height H substantially corresponds to the thickness of the second batch 19. This step for lowering the height may be carried out by pivoting R the entire structure bearing the storage device 12, the transfer device 14 and the conveyor 21. The second of these two steps consists in lifting the pile 6 according to a height H corresponding to the thickness of the second batch 19. The platform 8 of the magazine 7 rises (arrow M in FIG. 5).

The method for supplying sheets 1 to the machine for processing the sheets 2 preferably also comprises three additional steps. These three steps take place after the step consisting in transferring the sheets 1. The first of these three steps consists in actuating the pusher 9 and pushing the second batch 19 downstream (arrow P2 in FIG. 6) over a distance corresponding to the length of the second batch 19, to separate the second batch 19 from the pile 6. The second of these three steps consists in lifting M the pile 6 according to a height corresponding to the thickness of the second batch 19, and simultaneously transferring the sheets 1. The third of these three steps consists in repeating the previous steps consisting in pushing the next batch 19 and lifting the pile 6 until the pile 6 of sheets 1 is finished.

The machine for processing may also be a machine for printing cardboard sheets, for example by flexography, with a series of printing units arranged in rows. The machine for processing may also be a platen machine for cutting and creasing sheets of cardboard.

The present invention is not limited to the embodiments disclosed and illustrated. Numerous modifications may be made without otherwise departing from the context defined by the scope of the set of claims.

The invention claimed is:

1. A method for supplying plate elements to a machine for processing the plate elements from an initial pile of the plate elements, the method comprising:
   pushing a first batch of the plate elements in a downstream direction, from a top of the initial pile, until the first batch of the plate elements comes at a storage device which is configured for storing the first pushed batch of the plate elements and at a transfer device which is configured for transferring the plate elements of the first batch, the storage device being joined to the transfer device;
   displacing the storage device and the transfer device in the downstream direction over a distance corresponding to a length of the first batch of the plate elements to separate the first batch from the pile, thereby holding the pushed first batch between the storage device and the initial pile, while the first batch of the plate elements is being pushed; then
   transferring the plate elements of the first batch one after the other by the transfer device to the machine, after the step of displacing the storage device.

2. The method according to claim 1, further comprising the additional steps, after the step of transferring the plate elements of the first batch, of:
   lowering a height of the storage device according to a height corresponding to a thickness of a next batch of the plate elements; and
   lifting the initial pile according to a height corresponding to the thickness of a next batch of the plate elements.

3. The method according to claim 2, further comprising further steps, after the step of transferring the plate elements, of:
   pushing the next batch of the plate elements downstream over a distance corresponding to a second length of the next batch of the plate elements to separate the next batch from the pile;
   lifting the pile according to a height corresponding to the thickness of the next batch of the plate elements and simultaneously transferring the next batch of the plate elements downstream; and
   repeating the steps of pushing each successive next batch of the plate elements downstream and lifting the pile until all of the pile of the plate elements is finished.

4. A supply station for supplying plate elements to a machine for processing the plate elements from an initial pile of the plate elements, the supply station comprising:
   a pusher configured for pushing in a downstream direction a batch of the plate elements from a top of the pile;
   a sheet aligner positioned downstream of the pusher and configured for storing the batch of the pushed plate elements; and
   a belt conveyor configured for transferring the plate elements one after the other, from the sheet aligner to the machine; and
   a rollered belt mover displacement device configured for displacing simultaneously from upstream to downstream the sheet aligner and the belt conveyor over a distance corresponding to the length of the batch of the plate elements in the downstream direction so as to permit the pusher and the sheet aligner to separate the batch from the pile of the plate elements and to hold the batch at the sheet aligner and at the transfer device,
   wherein the sheet aligner is joined to the belt conveyor.

5. The station according to claim 4, further comprising a rollers configured for supporting the batch to be positioned between the pusher and the sheet aligner,
   wherein the rollers are configured to be extended in the downstream direction as a function of the length of the batch.

6. The station according to claim 5, further comprising an elevator device configured to vary a height of the sheet aligner, of the belt conveyor, and of the batch of the plate elements as a function of a thickness of a next batch of the plate elements then on the pile thereof.

7. The station according to claim 6, further comprising a conveyor of variable length positioned downstream of the sheet aligner and of the belt conveyor, the conveyor having a length which is a function of the length of the batch.

8. The station according to claim 7, wherein the elevator device is configured for pivoting all of the belt conveyor, the sheet aligner and the conveyor relative to an axis located at a downstream end of the conveyor.

9. The station according to claim 4, wherein the sheet aligner is in the form of a front positioning member located and configured to maintain a fixing of the batch.

10. The station according to claim 4, further comprising a magazine comprising a pile lifting mechanism capable of vertically lifting the pile of the plate elements on a lifting platform.

11. A processing machine for processing plate elements, comprising workstations for processing plate elements, an outlet for collecting the processed plate elements, and a supply station configured to supply the plate elements to the inlet of the machine according to claim 4.

12. The processing machine according to claim 11, comprising a frame,
   wherein the workstations are attached to the frame and comprise a series of printing units arranged downstream of the supply station.

* * * * *